Figures 1, 2:
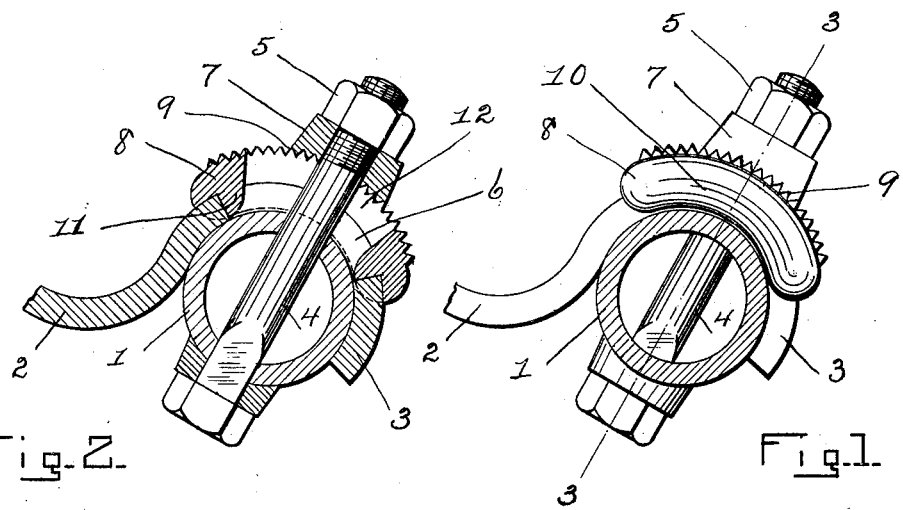

S. L. CLUETT.
HARROW TOOTH CLIP.
APPLICATION FILED SEPT. 19, 1912.

1,063,508.

Patented June 3, 1913.

WITNESSES:
R. A. Leduc.
G. M. Pitz.

INVENTOR
Sanford L. Cluett,
BY
Frank C. Curtis,
ATTORNEY

UNITED STATES PATENT OFFICE.

SANFORD L. CLUETT, OF HOOSICK FALLS, NEW YORK.

HARROW-TOOTH CLIP.

1,063,508.  Specification of Letters Patent.  Patented June 3, 1913.

Application filed September 19, 1912. Serial No. 721,219.

*To all whom it may concern:*

Be it known that I, SANFORD L. CLUETT, a citizen of the United States, residing at Hoosick Falls, county of Rensselaer, and State of New York, have invented certain new and useful Improvements in Harrow-Tooth Clips, of which the following is a specification.

The invention relates to such improvements and consists of the novel construction and combination of parts hereinafter described and subsequently claimed.

Reference may be had to the accompanying drawings, and the reference characters marked thereon, which form a part of this specification.

Similar characters refer to similar parts in the several figures therein.

Figure 3:
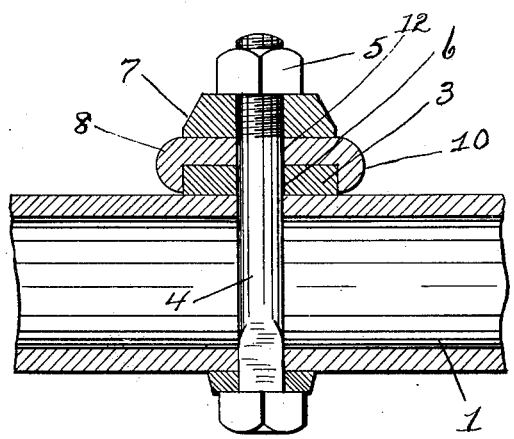

Figure 1 of the drawings is a vertical cross-section of the tooth-supporting shaft of a harrow taken at an intermediate point between two of the teeth. Fig. 2 is a vertical section of the same taken through the longitudinal middle of the tooth. Fig. 3 is a vertical section taken on the broken line 3—3 in Fig. 1, longitudinally of the tooth-supporting shaft.

The principal object of the invention is to facilitate rotative adjustment of a harrow-tooth upon its supporting shaft; to securely lock the tooth in adjusted position; and to facilitate access to the mechanism whereby the tooth is adjustably secured upon the shaft.

Referring to the drawings, wherein the invention is shown in preferred form, 1, is a hollow shaft adapted to support a plurality of harrow-teeth mounted thereon. The several harrow-teeth, 2, terminate at their inner ends in a circularly bent shank, 3, adapted to extend part-way around the shaft, and to be secured thereupon by means of a bolt, 4, extending diametrically through the shaft, and a nut, 5, fitting the screw-threaded end of the bolt. The shank of the harrow-tooth is provided with a longitudinal slot, 6, through which the bolt, 4, passes, and which permits the tooth to be rotatively adjusted upon the shaft. Interposed between the nut, 5, and the shank, 3, of the tooth, are a washer, 7, and a saddle, 8, having serrated interengaging surfaces, 9, of a general curvature concentric with the shaft, 1. The saddle, 8, has side-flanges, 10, which embrace between them the shank, 3, of the tooth; and it also has lugs, 11, fitting within the slot, 6, at the opposite ends thereof, whereby said saddle and the shank of the tooth are locked together so as to rotate in unison, the saddle being provided with a longitudinal slot, 12, through which the bolt, 4, passes, and which is adapted to permit a rotative movement of adjustment of the saddle and tooth upon the shaft. The serrated surfaces of the washer, 7, and saddle, 8, are adapted to interengage in different positions of rotative adjustment of the saddle and tooth upon the shaft, 1. To accomplish the desired adjustment, it is necessary merely to loosen the nut, 5, separate the washer, 7, slightly from the saddle, 8, rotate the saddle and tooth to the desired position upon the shaft, 1, and then seat the washer, 7, upon the saddle, 8, and lock the parts in adjusted position by tightening the nut, 5. The parts which it is necessary to manipulate in thus accomplishing the adjustment are all exposed on top of the shaft, 1, where they are readily accessible.

What I claim as new and desire to secure by Letters Patent is—

1. The combination with a tooth-supporting shaft; and a screw-bolt projecting therefrom; of a harrow-tooth having a curved shank adjustably mounted upon said shaft; a saddle interlocked with said shank; a nut on the end of said bolt; and a washer interposed between said nut and said saddle, said saddle and said shank being provided with longitudinal slots through which said bolt passes, and said washer and said saddle having serrated surfaces interengageable in different positions of rotative adjustment of said shank and saddle upon said shaft.

2. The combination with a tooth-supporting shaft; and a screw-bolt projecting therefrom; of a tooth having a curved shank adjustably mounted upon said shaft and provided with a longitudinal slot through which said bolt passes; a saddle superimposed upon the slotted portion of said shank, having inwardly projecting lugs occupying the opposite ends of the slot in said shank and provided with a slot through which said bolt passes; a nut on the end of said bolt; and a washer interposed between said nut and said saddle, said nut and said saddle having curved serrated surfaces adapted to interengage in different positions of rotative adjustment of said shank and saddle upon said shaft.

3. The combination with a tooth-supporting shaft; and a screw-bolt projecting therefrom; of a tooth having a curved shank adjustably mounted upon said shaft and provided with a longitudinal slot through which said bolt passes; a saddle superimposed upon the slotted portion of said shank, having inwardly projecting lugs occupying the opposite ends of the slot in said shank, and having side flanges adapted to embrace between them said shank and provided with a longitudinal slot through which said bolt passes; a nut on the end of said bolt; and a washer interposed between said nut and said saddle, said washer and said saddle having curved serrated surfaces adapted to engage in different positions of rotative adjustment of said shank and saddle upon said shaft.

In testimony whereof, I have hereunto set my hand this 16th day of September, 1912.

SANFORD L. CLUETT.

Witnesses:
W. I. SHAW,
WM. PORTMAN.

Copies of this patent may be obtained for five cents each, by addressing the "Commissioner of Patents, Washington, D. C."